United States Patent [19]

Bacskai

[11] Patent Number: 5,300,574
[45] Date of Patent: Apr. 5, 1994

[54] SUBSTANTIALLY NON-CROSSLINKED MALEIC ANHYDRIDE-MODIFIED ETHYLENE POLYMERS AND PROCESS FOR PREPARING SAME

[75] Inventor: Robert Bacskai, Kensington, Calif.

[73] Assignee: Chevron Research and Technology Company, San Francisco, Calif.

[21] Appl. No.: 91,526

[22] Filed: Jul. 14, 1993

Related U.S. Application Data

[63] Continuation of Ser. No. 669,140, Mar. 14, 1991, abandoned.

[51] Int. Cl.$^5$ .............. C08F 8/30; C08L 77/00
[52] U.S. Cl. .................. 525/181; 525/244; 525/263; 525/267; 525/273; 525/301; 525/309
[58] Field of Search .............. 525/181, 244, 263, 267, 525/273, 301, 309

[56] References Cited

U.S. PATENT DOCUMENTS

| | | | |
|---|---|---|---|
| 2,973,344 | 12/1957 | Fasce | 260/78.4 |
| 3,236,917 | 12/1957 | Natta et al. | 260/878 |
| 3,862,265 | 4/1972 | Steinkamp et al. | 260/878 |
| 3,884,882 | 1/1973 | Caywood, Jr. | 260/78.4 |
| 4,506,056 | 6/1982 | Gaylord | 524/445 |
| 4,957,974 | 9/1990 | Ilenda et al. | 525/301 |

FOREIGN PATENT DOCUMENTS

| | | | |
|---|---|---|---|
| 0029566 | 6/1981 | European Pat. Off. | C08L 77/00 |
| 0173572 | 3/1986 | European Pat. Off. | C08F 255/02 |
| 0300718 | 1/1989 | European Pat. Off. | C08F 255/00 |
| 60-49018 | 3/1985 | Japan . | |
| 62-223250 | 10/1987 | Japan . | |
| 2156364 | 10/1985 | United Kingdom | C08L 23/12 |
| 9102027 | 2/1991 | World Int. Prop. O. . | |

OTHER PUBLICATIONS

Gabara & Porejko, "Grafting of Maleic Anhydride on Polyethylene. I. Mechanism of Grafting in a Heterogeneous Medium in the Presence of Radical Initiators." Journal of Polymer Science: Part A-1, vol. 5, pp. 1547-1562 (1967).

Porejko et al., "Grafting of Maleic Anhydride on Polyethylene. II Mechanism of Grafting in a Homogeneous Medium in the Presence of Radical Initiators." Journal of Polymer Science: Part A-1, vol. 5, pp. 1563-1571 (1967).

*Primary Examiner*—Maurice L. Welsh
*Assistant Examiner*—Duc Truong
*Attorney, Agent, or Firm*—R. J. Sheridan; C. D. Holland; W. K. Turner

[57] ABSTRACT

Disclosed are substantially non-crosslinked anhydride-modified, saturated ethylene polymers and a process for making them which comprises mixing together in the absence of solvent:
(a) maleic anhydride;
(b) a free radical initiator;
(c) a saturated ethylene polymer; and
(d) a polyamide at a temperature at which the saturated ethylene polymer and polyamide undergo deformation and are converted to a molten or fluid state.

21 Claims, No Drawings

SUBSTANTIALLY NON-CROSSLINKED MALEIC ANHYDRIDE-MODIFIED ETHYLENE POLYMERS AND PROCESS FOR PREPARING SAME

This is a continuation of application Ser. No. 699,140, filed Mar. 14, 1991, abandoned.

BACKGROUND OF THE INVENTION

This invention relates to non-crosslinked, saturated ethylene polymers having maleic anhydride grafted thereto and a process for preparing such polymers.

The reaction of maleic anhydride with polymers is well known in the art. The thermal "ene" reaction between an unsaturated polymer and maleic anhydride has been widely used. U.S. Pat. No. 2,973,344, issued Feb. 28, 1961 to Fasce, discloses the preparation of modified polyolefins by heating low pressure polyalkene polymers which possess non-terminal unsaturation with maleic anhydride, in the presence or absence of either an inert hydrocarbon solvent and/or a peroxide catalyst. U.S. Pat. No. 3,884,882, issued May 20, 1975 to Caywood, Jr., discloses the preparation of adducts of maleic anhydride and unsaturated elastomeric ethylene-propylene-unconjugated diene terpolymer by reaction at elevated temperatures in the absence of a radical catalyst, e.g., an organic peroxide. The presence of a radical catalyst results in the crosslinking of the elastomer.

The grafting of maleic anhydride onto saturated polymers in the presence of free radicals, either generated by shearing or by heating free radical precursors such as organic peroxides, is also well known in the art. However, reaction in the absence of a solvent results in crosslinking in, e.g., polyethylene or ethylene-propylene copolymers. U.S. Pat. No. 3,236,917, issued Feb. 22, 1966 to Natta et al., discloses that the grafting of maleic anhydride onto saturated copolymers of ethylene and an $\alpha$-olefin, in the presence of a radical initiator at elevated temperatures and in the absence of a solvent, results in the grafting of maleic anhydride onto two chains, thereby crosslinking the copolymers. U.S. Pat. No. 3,862,265, issued Jan. 21, 1975 to Steinkamp et al., discloses the controlled degradation of polyolefins in an extruder in the presence of a radical catalyst, and the concurrent grafting of maleic anhydride onto the base polymer.

Gabara and Parejko (*Journal of Polymer Science*, A-1, 5, 1547 (1967)) reported that when maleic anhydride is grafted onto low density polyethylene film suspended in an acetic anhydride solution containing a free radical catalyst, the film becomes crosslinked. However, reaction in a solvent such as xylene results in appendage of maleic anhydride without crosslinking the polyethylene (S. Parejko, W. Gabara and J. Kulesza, *Journal of Polymer Science*, A-1, 5, 1563 (1967)). U.S. Pat. No. 3,873,643, issued Mar. 25, 1975 to Wu et al., discloses that after mixing high density polyethylene with maleic anhydride in the presence of a radical catalyst in a Brabender Plasticorder at elevated temperatures, the melt index of the polymer is significantly reduced.

Attempts have been made to prevent or avoid crosslinking during the reaction of maleic anhydride with polymers. For example, solvents have been used to prevent crosslinking of the polymer during this reaction, but the use of solvents requires the use of equipment for solution reactions, and the separation and recovery of the solvent as well as the polymer.

When the reaction is conducted in the absence of solvent, the reaction results in very high levels of crosslinking. Such crosslinked products are particularly troublesome because these products do not have good flow properties and are, therefore, not useful in extrusion applications. On the other hand, grafted products are preferably prepared in an extruder in order to achieve higher product quality as well as to minimize costs. However, extruder reactions are by necessity done in the absence of large amounts of solvent. (A small amount of solvent may be used to introduce, e.g., a catalyst into the extruder, though.) Thus lies the heart of the problem. In order to obtain the benefits of the products prepared in an extruder, it is necessary to avoid the use of solvents; on the other hand, the absence of solvents results in levels of crosslinking which render the product unacceptable for extruder applications.

U.S. Pat. No. 4,506,056, issued Mar. 19, 1985 to Gaylord, discloses a process for preparing carboxyl-containing polymers which involves mixing together maleic anhydride, a free radical initiator, an additive which inhibits the homopolymerization of maleic anhydride but not that of methyl methacrylate below about 100° C., and a polymer, above its melting point, in the absence of solvent. Examples of the additive are various nitrogen-, phosphorous- and sulfur-containing compounds. While the use of such additives results in products with little or no crosslinking, the presence of these additives in the resulting grafted polymers can cause odor problems, lead to discoloration of the polymer, provide undesirable polymer degradation mechanisms, and can result in toxicity problems, especially where the product polymer is used in food packaging.

A particularly useful copolymer that finds application in foodwraps, etc. is a copolymer of ethylene and methyl acrylate. When grafted with a grafting agent such as maleic anhydride, the resulting product has enhanced adhesion properties which not only allows it to be bound to aluminum, but additionally allows for printing to be done on its surface.

In view of the above, it is apparent that there is a need to develop a process which can prepare substantially non-crosslinked grafted ethylene polymers, such as ethylene-methyl acrylate copolymers, in the absence of solvent and without the additives used in the prior art.

It has now been discovered that crosslinking can be decreased during the free radical initiated reaction, in the absence of solvent, of saturated ethylene polymers and maleic anhydride if the reaction is conducted in the presence of a polyamide.

SUMMARY OF THE INVENTION

In accordance with the present invention, there is provided a process for preparing an anhydride-modified, saturated ethylene polymer having decreased crosslinking comprising mixing together in the absence of solvent:
 (a) maleic anhydride;
 (b) a free radical initiator;
 (c) a saturated ethylene polymer; and
 (d) a polyamide at a temperature at which the saturated ethylene polymer and polyamide undergo deformation and are converted to a molten or fluid state. Also provided in accordance with this invention is the product produced by this process.

Further provided in accordance with the present invention is a composition comprising (a) about 90 to about 99 weight percent essentially non-crosslinked, anhydride-modified, saturated ethylene polymer and (b) about 1 to about 10 weight percent polyamide, said percentage being based on the weight of the saturated ethylene polymer prior to modification with anhydride.

Also provided in accordance with the present invention is a method of controlling the melt index of an anhydride-modified saturated ethylene polymer comprising mixing together in the absence of solvent:

(a) maleic anhydride;
(b) a free radical initiator;
(c) a saturated ethylene polymer; and
(d) a polyamide at a temperature at which the saturated ethylene polymer and polyamide undergo deformation and are converted to a molten or fluid state.

DETAILED DESCRIPTION OF PREFERRED EMBODIMENTS

The saturated ethylene polymers useful in the practice of this invention are ethylene homopolymers or copolymer. As used herein, the term "saturated" refers to polymers which are fully saturated, but also includes polymers containing up to about 5% unsaturation.

The homopolymers of ethylene include those prepared under either low pressure, i.e., linear or high density polyethylene, or high pressure, i.e., branched or low density polyethylene.

The copolymers of ethylene useful in the present invention include copolymers of ethylene with one or more addition polymerizable, unsaturated monomers. Examples of such copolymers include, but are not limited to, copolymers of ethylene and an α-olefin (such as propylene, butene or hexane) including linear low density polyethylene, copolymers of ethylene and vinyl esters of linear or branched carboxylic acids having 1-24 carbon atoms such as ethylene-vinyl acetate copolymers, and copolymers of ethylene and acrylic or methacrylic esters of linear, branched or cyclic alkanols having 1-28 carbon atoms. Examples of these latter copolymers include ethylene-alkyl (meth)acrylate copolymers, such as ethylene-methyl acrylate copolymers.

The free radical initiators useful in the practice of this invention include acyl peroxides such as benzoyl peroxide, dialkyl or aralkyl peroxides such as di-t-butyl peroxide; dicumyl peroxide; cumyl butyl peroxide; 1,1-di-t-butyl peroxy-3,5,5-trimethylcyclohexane; 2,5-dimethyl-2,5-di(t-butylperoxy) hexane; 2,5-dimethyl-2,5-bis (t-butylperoxy) hexyne-3 and bis(α-t-butyl peroxyisopropylbenzene), peroxyesters such as t-butyl peroxypivalate; t-butyl peroctoate; t-butyl perbenzoate; 2,5-dimethylhexyl-2,5-di(perbenzoate); t-butyl di(perphthalate); dialkyl peroxymonocarbonates and peroxydicarbonates, hydroperoxides such as t-butyl hydroperoxide, p-methane hydroperoxide, pinane hydroperoxide and cumene hydroperoxide and ketone peroxides such as cyclohexanone peroxide and methyl ethyl ketone peroxide. Azo compounds such as azobisisobutyronitrile may also be used.

Maleic anhydride per se may be used in the practice of this invention, or maleic acid may be used if the reaction is is carried out at about 140° C. or higher, since the acid is converted to the anhydride under those conditions.

The polyamides which are useful in this invention are effective in reducing the crosslinking which occurs during the radical catalyzed reaction of maleic anhydride and the molten, saturated ethylene polymer. These polyamides are polymers prepared from, e.g., a dicarboxylic acid and a diamine. Examples of such polyamides include, but are not limited to, nylon 11, nylon 12, nylon 66 and nylon 6.

In the practice of the present invention, typically a mixture of maleic anhydride and free radical initiator is mixed with the ethylene polymer and polyamide at a reaction temperature above the softening points of the ethylene polymer and polyamide or above the temperature where they undergo deformation and are converted to a molten or fluid state.

The reaction mixture is subjected to mechanical deformation in a suitable mixing device, such as a Brabender Plasticorder, a roll mill, a single or multiple screw extruder or any other of the well known mechanical mixing equipment normally used in the mixing, compounding, processing or fabrication of polymers. An extruder having one or more ports is a particularly desirable reaction vessel, although it is by no means necessary.

The solid ethylene polymer, e.g., pellets or powder, may be premixed with the maleic anhydride, initiator and polyamide, and the resultant mixture added to the mixing device. Alternatively, the mixture of reactants may be added to the molten polymer.

The maleic anhydride and initiator is generally added continuously or in several portions over a period of time to promote homogeneous distribution of anhydride groups throughout the mass of the ethylene polymer. The reaction is extremely fast and occurs to a major extent when the maleic anhydride and initiator come in contact with the heated polymer. However, the reaction can continue when the molten polymer is conveyed away from the point of contact with the maleic anhydride.

An extruder containing an entry port for the addition of the ethylene polymer (or mixture of ethylene polymer and polyamide), one or more reduced pressure zones with injection orifices at points where the ethylene polymer (or mixture of ethylene polymer and polyamide) is molten for addition of the maleic anhydride and initiator, and a reduced pressure zone for venting off any unreacted maleic anhydride or volatiles formed during the process, may be used advantageously in the practice of the present invention.

In general, the order of addition of the ethylene polymer, maleic anhydride, initiator and polyamide is limited only by the fact that the polyamide must be present in the reaction mixture before the maleic anhydride reacts with the ethylene polymer.

The anhydride-modified polymer may be freed of unreacted maleic anhydride, if any, by solution in a suitable solvent and precipitation in a non-solvent, e.g., the polymer may be dissolved in refluxing xylene and precipitated in acetone or methyl ethyl ketone.

Unreacted maleic anhydride may also be removed from the polymer by treatment with water. The anhydride groups appended to the polymer are converted to carboxylic acid groups on hydrolysis and, if desired, may be regenerated by heating to eliminate water.

The anhydride content of the final maleic anhydride-modified ethylene polymer may be varied from less than 0.1 to about 5, preferably about 0.1 to about 1.0 percent by weight of the ethylene polymer by adjustment of the reactant quantities. The maleic anhydride content of the reaction mixture may be varied between about 0.1 and 5, preferably between about 0.1 and about 1.0 percent by weight of the weight of the ethylene polymer.

The concentration of the free radical initiator is generally between 0.5 and 100 percent of the weight of the maleic anhydride. The susceptibility of the molten ethylene polymer to crosslink is dependent upon its chemical structure. Since the crosslinking of the molten ethylene polymer may occur in the presence of the free radical initiator alone and is increased when maleic anhydride is also present, the concentration of the free radical initiator is selected to minimize, but not necessarily eliminate, these reactions when undesirable.

The polyamide is generally used at a concentration of from about 1.0 to about 10, preferably from about 2.0 to about 5.0 percent by weight based on the weight of the ethylene polymer. In the case of the compositions of this invention which comprise an anhydride-modified saturated ethylene polymer and a polyamide, this means that the weight percent of polyamide is calculated based on the amount of saturated ethylene polymer prior to grafting of the maleic anhydride. The actual amount of polyamide required is, however, a function of the concentration of both maleic anhydride and free radical initiator and the susceptibility of the ethylene polymer to crosslink.

The extent of crosslinking in the reaction product can be determined by heating the reaction product in a refluxing solvent, e.g., xylene. After the sample has been heated in refluxing solvent for 4-5 hours, the resultant hot solution or suspension is filtered into acetone or other non-solvent to separate the insoluble, crosslinked gel from the soluble non-crosslinked polymer. Another measure of the extent of crosslinking is the melt viscosity of the product. For example, a maleic anhydride-modified high density polyethylene (HDPE) prepared without a polyamide has a typical melt index of about 2.5. Since the starting HDPE has a typical melt index of 29, it is evident that the maleic anhydride-modified HDPE has undergone extensive crosslinking. On the other hand, maleic anhydride-modified HDPE having grafted maleic anhydride contents of about 0.6 to 0.8% prepared in accordance with this invention (i.e., in the presence of a polyamide) have typical melt indices of about 7 to 10. Thus, it is apparent that the practice of the present invention substantially decreases the crosslinking of the maleic anhydride-modified ethylene polymer product, as well as providing a method for controlling the melt index of anhydride-modified saturated ethylene polymers.

The product prepared in accordance with this invention show good adhesion to aluminum and to polar polymers such as ethylene-vinyl alcohol copolymers. These products are, thus, useful as tie layers for coextruded multilayer laminates useful in, e.g., packaging applications.

The present invention is illustrated in greater detail by the specific examples presented below, but it is to be understood that these are illustrative embodiments and this invention is not to be limited by any of the details of the description, but rather is to be construed broadly within its scope and spirit.

EXAMPLES 1-4 and COMPARATIVE EXAMPLE A

A saturated ethylene polymer was grafted with maleic anhydride by reactive extrusion by feeding each in turn of the feed mixtures indicated below in Table 1 into a twin screw, rod die extruder which was operated at 200° C. at 30 RPM. Each feed mixture was prepared by dry blending the ethylene polymer, maleic anhydride, nylon and initiator by tumbling. The resulting mixture was then fed into the hopper of the extruder. The residence time of the feed mixture in the extruder was about 4.7 minutes. The resulting products had the characteristics indicated in Table 1.

Each of the feed mixtures shown in Table 1 utilized as the saturated ethylene polymer a high density polyethylene (HDPE 9122, available from Chevron Chemical Company) having a melt index ("M.I.") of 29 g/10 minutes. A blend was also made containing only HDPE 9122 and nylon 11 (3 wt. % nylon based on the weight of HDPE 9122), and that blend had a melt index of 22.8 g/10 minutes. The percentages indicated in Table 1 are weight percent based on the weight of the HDPE.

Following extrusion, the crude product was dissolved in boiling xylene followed by filtration to remove any crosslinked polymer. The non-crosslinked, grafted polymer was then precipitated in cold acetone, recovered and dried. The polymer was then titrated with base to determine the amount of anhydride in the polymer. Unreacted maleic anhydride remained in the acetone.

TABLE 1

| | Feed | | | | Product MAH, % | | |
|---|---|---|---|---|---|---|---|
| Ex. No. | HDPE | MAH[1] % | L101[2] % | Nylon 11 % | Crude polymer[3] | Grafted polymer[4] | M.I. g/10 min. |
| A | 100 pbw | 1 | 0.1 | 0 | 0.97 | 0.57 | 1.5 |
| 1 | 100 pbw | 1 | 0.1 | 1 | 0.80 | 0.59 | 6.8 |
| 2 | 100 pbw | 1 | 0.1 | 2 | 0.77 | 0.61 | 7.2 |
| 3 | 100 pbw | 1 | 0.1 | 3 | 0.89 | 0.77 | 8.6 |
| 4 | 100 pbw | 1 | 0.1 | 6 | 0.74 | 0.65 | 9.8 |

[1] Maleic anhydride
[2] Lupersol 101 - 2,5-dimethyl-2,5-di(t-butylperoxy)hexane
[3] Before removal of unreacted maleic anhydride
[4] After removal of unreacted maleic anhydride

EXAMPLES 5-8 and COMPARATIVE EXAMPLE B

The procedure of Examples 1-4 was repeated using the feed mixtures and with the results indicated in Table 2 below. In these examples, the saturated ethylene polymer used was a high density polyethylene (HDPE 9122) having a melt index of 37 g/10 minutes, and the nylon was nylon 12. As in Table 1, the percentages are weight percent based on the weight of the HDPE.

TABLE 2

| | Feed | | | | Product | | |
|---|---|---|---|---|---|---|---|
| | | | | | MAH, % | | |
| Ex. No. | HDPE | MAH % | L101 % | Nylon 12 % | Crude polymer | Grafted polymer | M.I. g/10 min[5] |
| B | 100 pbw | 1 | 0.1 | 0 | 0.95 | 0.91 | 1.6, 1.2 |
| 5 | 100 pbw | 1 | 0.1 | 1 | 0.96 | 0.88 | 2.6, 2.5 |
| 6 | 100 pbw | 1 | 0.1 | 2 | 0.90 | — | 3.7, 3.1 |
| 7 | 100 pbw | 1 | 0.1 | 3 | 0.79 | — | 5.3, 5.2 |
| 8 | 100 pbw | 1 | 0.1 | 6 | 0.73 | 0.72 | 4.9, — |

[5]Two measurements taken

The data in Tables 1 and 2 clearly indicates that the presence of nylon during the grafting of the maleic anhydride onto HDPE provided grafted polymers with melt indices substantially higher than when grafting occurred in the absence of nylon. These higher melt indices are an indication that the grafted polymers prepared in the presence of nylon have reduced crosslinking compared to those prepared without nylon being present.

What is claimed is:

1. A process for preparing an anhydride-modified, saturated ethylene polymer having decreased crosslinking comprising mixing together in the absence of solvent:
   (a) maleic anhydride;
   (b) a free radical initiator;
   (c) a saturated ethylene polymer; and
   (d) a polyamide
at a temperature at which the saturated ethylene polymer and polyamide undergo deformation and are converted to a molten or fluid state.

2. The process of claim 1 wherein the saturated ethylene polymer is selected from high density polyethylene, low density polyethylene, linear low density polyethylene, ethylene-alkyl acrylate copolymers and ethylene-vinyl ester copolymers.

3. The process of claim 1 wherein the polyamide is nylon 11.

4. The process of claim 1 wherein the free radical initiator is selected from dicumyl peroxide; 2,5-dimethyl-2,5-di(t-butylperoxy) hexane; and 2,5-dimethyl-2,5-bis(t-butylperoxy) hexyne-3.

5. The process of claim 1 wherein the maleic anhydride is employed in an amount from about 0.1 to about 5.0 weight percent based on the weight of the saturated ethylene polymer.

6. The process of claim 1 wherein the polyamide is employed in an amount from about 1.0 to about 10 weight percent based on the weight of the saturated ethylene polymer.

7. The product produced by the process of claim 1.

8. The product of claim 7 wherein the saturated ethylene polymer is selected from high density polyethylene, low density polyethylene, linear low density polyethylene, ethylene-alkyl acrylate copolymers and ethylene-vinyl ester copolymers.

9. The product of claim 7 wherein the polyamide is nylon 11.

10. The product of claim 7 wherein the free radical initiator is selected from dicumyl peroxide; 2,5-dimethyl-2,5-di(t-butylperoxy) hexane; and 2,5-dimethyl-2,5-bis(t-butylperoxy) hexyne-3.

11. The product of claim 7 wherein the maleic anhydride is employed in an amount from about 0.1 to about 5.0 weight percent based on the weight of the saturated ethylene polymer.

12. The product of claim 7 wherein the polyamide is employed in an amount from about 1.0 to about 10 weight percent based on the weight of the saturated ethylene polymer.

13. A composition comprising (a) about 90 to about 99 weight percent essentially non-crosslinked, anhydride-modified, saturated ethylene polymer and (b) about 1 to about 10 weight percent polyamide, said percentage being based on the weight of the saturated ethylene polymer prior to modification with the anhydride.

14. The composition of claim 13 wherein the saturated ethylene polymer is selected from high density polyethylene, low density polyethylene, linear low density polyethylene, ethylene-alkyl acrylate copolymers and ethylene-vinyl ester copolymers.

15. The composition of claim 13 wherein the polyamide is nylon 11.

16. A method of controlling the melt index of an anhydride-modified saturated ethylene polymer comprising mixing together in the absence of solvent:
   (a) maleic anhydride;
   (b) a free radical initiator;
   (c) a saturated ethylene polymer; and
   (d) a polyamide at a temperature at which the saturated ethylene polymer and polyamide undergo deformation and are converted to a molten or fluid state.

17. The method of claim 16 wherein the saturated ethylene polymer is selected from high density polyethylene, low density polyethylene, linear low density polyethylene, ethylene-alkyl acrylate copolymers and ethylene-vinyl ester copolymers.

18. The method of claim 16 wherein the polyamide is nylon 11.

19. The method of claim 16 wherein the free radical initiator is selected from dicumyl peroxide; 2,5-dimethyl-2,5-di(t-butylperoxy) hexane; and 2,5-dimethyl-2,5-bis(t-butylperoxy) hexyne-3.

20. The method of claim 16 wherein the maleic anhydride is employed in an amount from about 0.1 to about 5.0 weight percent based on the weight of the saturated ethylene polymer.

21. The method of claim 16 wherein the polyamide is employed in an amount from about 1.0 to about 10 weight percent based on the weight of the saturated ethylene polymer.

* * * * *